Jan. 21, 1958     T. J. McLAUGHLIN     2,820,592
DISTANCE MEASURING SYSTEM
Filed Aug. 19, 1953
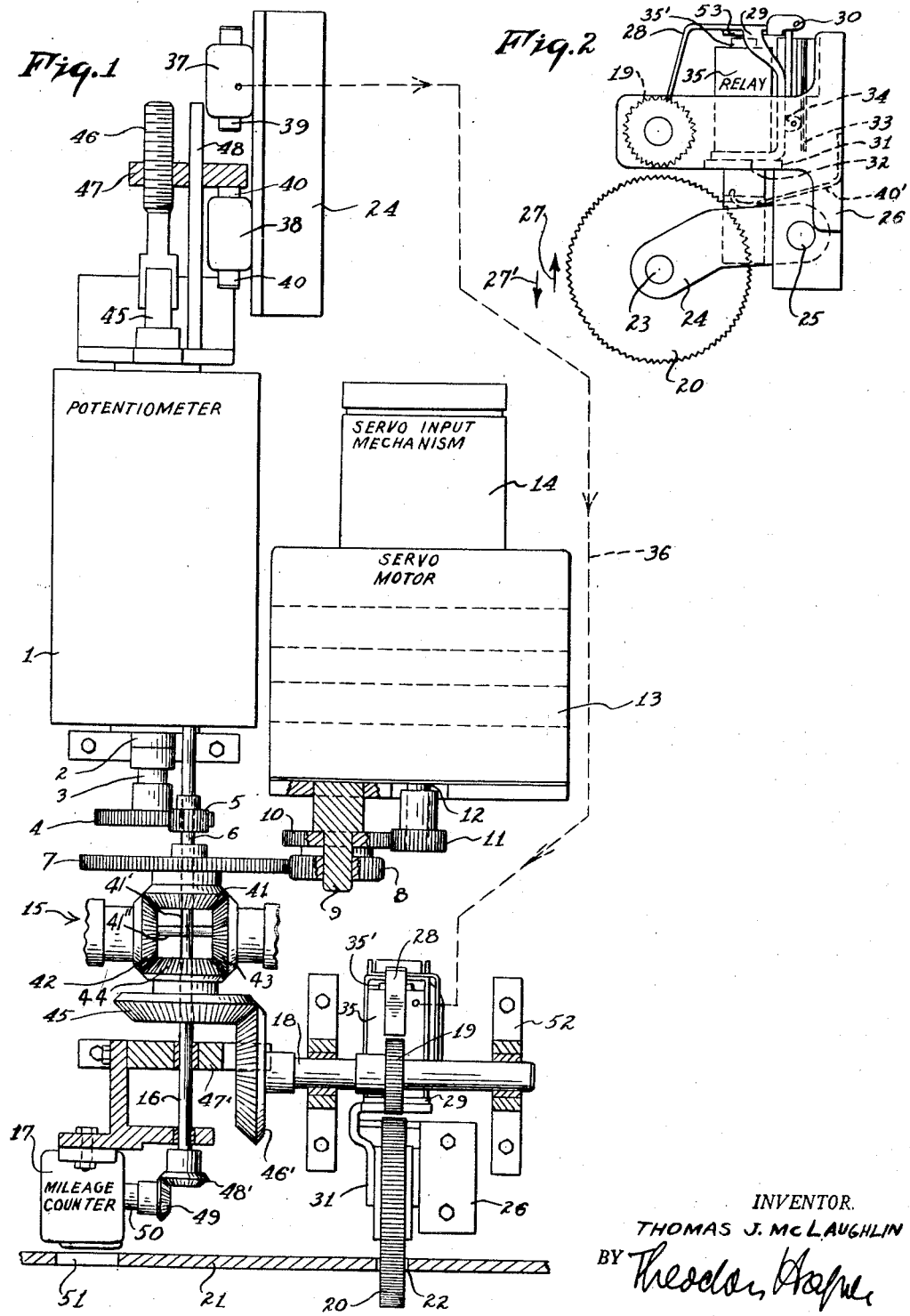
INVENTOR.
THOMAS J. McLAUGHLIN
BY
ATTORNEY

United States Patent Office 2,820,592
Patented Jan. 21, 1958

2,820,592

DISTANCE MEASURING SYSTEM

Thomas J. McLaughlin, New Milford, N. J., assignor to Loral Electronics Corporation, a corporation of New York Application August 19, 1953, Serial No. 375,287

6 Claims. (Cl. 235—92)

This invention relates to a measuring device and more specifically to the measuring of quantities such as mileage or other distances where the measuring range is finite and where it is required from time to time after having measured a predetermined quantity to return or readjust the device to zero rest or any other position.

One of the objects of the invention is a measuring device adapted under control of electrical signals or pulses to indicate or count mileage and which is adjustable under control of a manual or thumb wheel to be returned to a predetermined zero position, but not further.

Another object of the invention is in a measuring device to provide manual zero adjustment means for the indicator and locking means under control of the position of manual adjustment as well as under control of a predetermined indicator position for preventing the indicator to exceed that predetermined position.

Still another object of the invention is to control a mileage or distance counter over one branch of a differential gear mechanism, the other branch of which is manually adjustable and locked when the manual adjustment is inoperative, the locking is caused to be inoperative after the counter is adjusted to a predetermined or zero position.

These and other objects of the invention will be more fully understood from the drawings wherein Figs. 1 and 2 show schematically in top and side elevations respectively, an adjustable pulse controlled mileage counter such as is used in piloting equipment for airborne operations embodying certain features of the invention.

In Figs. 1 and 2 rotary type potentiometer 1 has a slider not shown driven over coupling 2, shaft 3, gears 4, 5, shaft 6, through a differential gear mechanism 15 to gears 7, 8, shaft 9, gears 10, 11 by shaft 12 of a motor 13 which is controlled in otherwise well known manner by a servo-mechanism 14 through voltages derived from a measuring circuit not shown also in well known manner and in a manner which is believed to be relatively unimportant for the purpose of this invention.

Shaft 6 driving potentiometer 1 is also coupled to a differential gear mechanism 15, one branch or shaft 16 of which drives a mileage counter schematically indicated at 17 and visible from front panel 21 of the aircraft pilot's cabin.

A shaft 18 is coupled to a tooth wheel 19 which is arranged to mesh with thumb wheel 20 mounted in and projecting from panel 21 through opening 22 depending upon the position into space of the thumb wheel 20.

For this purpose, thumb wheel 20 is mounted slidably or hingedly in opening or slot 22 of panel 21 in a manner well known per se as can be easily perceived by anyone familiar with the art of instrument technique.

In the specific embodiment of such hinged mounting shown in Figs. 1 and 2, thumb wheel 20 is mounted rotatable on and with shaft 23 in bracket 24 which in turn is mounted rotatable on and with shaft 25 rotatably supported on frame 26. Thus bracket 24 and thumb wheel 20 can be rocked to and fro in directions schematically indicated by arrows 26, 27 so as to engage with and disengage from tooth wheel 19 respectively, and more particularly causing tooth wheel 19, counter 17 and the slider or shaft of potentiometer 1 coupled thereto to rotate in any desired position, for example into the initial or zero position of the slider of potentiometer 1.

In order to prevent any undesired movement of tooth wheel 19 at a time when it is not coupled to thumb wheel 20, locking ratchet 28 is attached to lever 29 rotatably mounted at 30 and under control of lever 29 which causes engagement of the teeth of tooth wheel 19, thus preventing tooth wheel 19 from turning.

In accordance with this invention, locking pawl 28 is controlled in two ways:

In the first instance, locking pawl 28 is mechanically controlled in its position by the hinging movement of thumb wheel 20 in directions 27', 27, which causes lever 31 mounted on shaft 25 to engage with or disengage from operating lever 29, causing lever 29 through contact surface 32 to move pawl 28 into inoperative position out of contact with tooth wheel 19. As soon as the pressure exerted by thumb wheel 20 upon contact surface 32 is relaxed, pawl 28 will be moved for example by a spring schematically shown at 33 and connected to lever 29 over coupling member 34.

At the same time locking pawl 28 is also controlled in its position electrically under control of a solenoid coil, schematically indicated at 35 having an armature 35' and energized and/or de-energized as the case may be under control of predetermined position or positions of the slider of potentiometer 1.

Energization of solenoid coil 35 for example is controlled as schematically indicated by dotted line 36 by the contacts of microswitches 37, 38—connecting for example solenoid coil 35 to a battery not shown—having operating buttons 39, 40 which are pressed under control of predetermined positions of the slider of potentiometer 1, causing solenoid coil 35 to be energized or de-energized as the case may be, thereby causing a desired movement of locking pawl 28.

For example in the embodiment of the invention shown in Figs. 1 and 2, as soon as potentiometer 1 under control of thumb wheel 20, tooth wheel 19 and shaft 18 of differential gear 7 is turned back towards its zero position and attains that zero position, solenoid 35 operates to hold locking pawl 28 in unlocked position, even after thumb wheel 20 has been returned to its inoperative position by manual movement into direction 27' or under control of a spring 40' attached to frame 26, as will be explained further below. Zero position on the counter 17, however, is disposed at such point that the operating button 40 is just out of contact so that the potentiometer and its slider may be driven after commencement of operation.

In this way, in the zero or end position of potentiometer 1, shaft 18 and tooth wheel 19 will be permitted to turn freely under control of motor 13, thus taking up the power of momentum exerted by motor 13 and preventing any damage to potentiometer 1.

More specifically, the differential gear mechanism 15 includes gears 41, 42, 43 and 44.

Differential gear mechanism operates as is well known in the art in the following manner:

If gears 42, 43 having a common shaft 41″ are held fixedly and wheel 41 is driven, then wheel 44 and shaft 18 will rotate. However, if wheel 44 is held fixedly shaft 41″ will rotate about shaft 41′ and thereby rotation shafts 6 and 16 connected thereto.

Gear 41 is coupled to gear 7, driving over shaft 41″ of gears 42, 43, shaft 6 and gears 4 and 5, shaft 3 and coupling 2 the slider shaft of potentiometer 1, which extends through the interior of potentiometer 1 and has an outer extension 45 coupled to a screw 46 which if rotated with slider shaft 45 of potentiometer 1 will move a nut member 47 in axial direction, sliding over a guide rail 48 in a direction parallel to that guide rail 48. During manual re-setting, the gear 41 remains stationary due to the inertia of the motor 13 and gears 8, 10, and 11.

Thus nut member 47 dependent upon its longitudinal position on guide rail 48 is permitted to contact at least one of control buttons 40, 39 and thereby to operate at least one of microswitches 37, 38 determining predetermined positions of potentiometer 1, for example one of its end positions and thereby means are provided for energizing or de-energizing as the case may be, depending upon the desired mode of operation, unlocking solenoid 35, 35' and releasing locking pawl 28 as shown in Figs. 1 and 2 or any other locking or unlocking mechanism provided in accordance with this invention for distance adjustment.

Gear 44 of differential gear mechanism 15 is fixedly coupled to gear 45 which in turn meshes with gear 46'. The gears 44 and 45 are supported upon the shaft 16, and are capable of rotational movement with respect to said shaft.

On the other side, gear 46 is coupled to shaft 18 carrying mounted thereupon tooth wheel 19 rotatably supported on bracket 52.

Thus if gear 44 is held fixedly, rotation of motor 13 will cause rotation of shaft 41' about shaft 41" and thereby cause rotation of shafts 16 and 6 and movement of potentiometer 1 and counter 17.

However, if gear 44 is permitted to rotate, shaft 41" will remain stationary with respect to shaft 41' and shaft 41' will not rotate thereby causing shafts 16 and 6 to be at rest, with potentiometer and counter 17 being also at rest.

Movement of wheel 41 under control of motor 13 will only rotate wheels 42, 43 about common shaft 41" thereby rotating wheels 44, 45, 46 shaft 18 and toothwheel 19 and by taking up the momentum of motor 13 preventing damage to potentiometer 1.

Locking pawl 28 is shown in Fig. 2 in locking engagement with tooth wheel 19 and as already stated above forms the end of a bent lever 29 engaging, if operated, thumb wheel controlled by bracket 31 along contact surface 32.

In this way thumb wheel 20 is pushed into direction of arrow 27 against the pressure of spring 40', will be brought into engagement with tooth wheel 19. At the same time under control of levers 29 and 31, locking pawl 28 is moved out of contact with tooth wheel 19.

During manual resetting of the counter 17 by means of the thumb wheel 20, motion is transmitted from the tooth wheel 20 to tooth wheel 19 with which it is engaged, through the shaft 18, the gear 46', the gears 45 and 44, 42 and 43, to cause orbital movement of the last mentioned gears about the shaft 41'. Rotational motion is imparted through the shaft 16 to the gear 48', the gear 49 and the shaft 50.

Locking pawl 28 has attached thereto a permanent magnet armature 53 which cooperates with armature 35' of coil 35.

Thus, for example under control of and depending upon the energization of coil 35, armature 35' causes attraction of armature 53 and unlocking of pawl 28 in one position of potentiometer 1—and under control of one of the switches 37, 38—while in another position of potentiometer 1—and under control of another of the set of switches 37, 38—and depending upon the current flow through coil 35, armature 35' is caused to receive a similar energization, causing armature 53 to be repulsed and pawl 28 and tooth wheel 19 to be held in unlocked position, all under control of corresponding switches, such as shown in Fig. 1 at 37, 38 and depending upon predetermined positions such as end and/or start positions of the slider of potentiometer 1.

The invention is of course not limited to the particular locking and unlocking means shown and illustrated nor is it limited to the mechanical and electrical devices which are used for locking and unlocking. The invention may be applied to any type of measuring device and to any form of positioning, all this without departing from the scope of the disclosure.

I claim:

1. In a distance measuring system having a motor driven potentiometer, and an indicating element driven by said potentiometer, the improvement comprising: a differential having first and second motion input gears and a pair of motion output gears driving said indicating element; means for manually adjusting said indicating element; said motor driven potentiometer being engaged with said first motion input gear; said manual adjusting means being engaged with said second motion input gear, said manual adjusting means including pawl means for locking said second motion input gear.

2. In a distance measuring system having a motor driven potentiometer, the improvement comprising: a differential having first and second motion input gears and a pair of motion output gears driving said indicating element; means for manually adjusting said indicating element; said motor driven potentiometer being engaged with said first motion input gear; said manual adjusting means including a thumb wheel mounted for rotational and translational motion and pawl means for locking said second motion input gear against movement; said pawl means being mounted for translational movement with said thumb wheel; said wheel having a first relative position in which said wheel is in disengaged condition with respect to said second motion input gear, and in which position said pawl means is in an engaged condition; said wheel having a second relative position in which said wheel is in engaged condition with respect to said second motion input gear, and in which position said pawl means is in disengaged condition.

3. In a distance measuring system having a motor driven potentiometer, the improvement comprising: a differential having first and second motion input gears and a pair of motion output gears driving said indicating element; means for manually adjusting said indicating element; said motor driven potentiometer being engaged with said first motion input gear; said manual adjusting means including a thumb wheel mounted for rotational and translational motion and pawl means for locking said second motion input gear against movement; said pawl means being mounted for translational movement with said thumb wheel; said wheel having a first relative position in which said wheel is in disengaged condition with respect to said second motion input gear, and in which position said pawl means is in an engaged condition; said wheel having a second relative position in which said wheel is in engaged condition with respect to said second motion input gear, and in which position said pawl means is in disengaged condition; said circuit element including limit switch means, said pawl means including relay means connected to said switch means; whereby actuation of said limit switch means serves to move said ratchet means to disengaged condition irrespective of the relative position of said thumb wheel.

4. A distance measuring system comprising servo motor input means, a distance indicating element, potentiometer means and a differential having first and second motion input gears; said potentiometer means and distance indicating element being driven through a pair of motion output gears on said differential; said servo motor input means transmitting motion through said first motion input gear; said second motion input gear having manual adjusting means associated therewith.

5. A distance measuring system comprising servo motor input means, a distance indicating element, potentiometer means and a differential having first and second motion input gears; said potentiometer means and distance indicating element being driven through a pair of motion output gears on said differential; said servo motor input means transmitting motion through said first motion input gear; said second motion input gear having manual adjusting means thereon; said manual adjusting means including a thumb wheel mounted for rotational and translational motion and pawl means for locking said second motion input gear against movement; said pawl means being mounted for translational movement with said thumb wheel; said wheel having a first relative position in which said wheel is in disengaged condition with respect to said second motion input gear, and in which position said pawl means is in engaged condition; and a second relative position in which said wheel is in engaged condition with respect to said motion input gear, and in which position said pawl means is in disengaged position.

6. A distance measuring system comprising servo motor input means, a distance indicating element, potentiometer means and a differential having first and second motion input gears; said potentiometer means and distance indicating element being driven through a pair of motion output gears on said differential; said servo motor input means transmitting motion through said first motion input gear; said second motion input gear having manual adjusting means thereon; said manual adjusting means including a thumb wheel mounted for rotational and translational motion and pawl means for locking said second motion input gear against movement; said pawl means being mounted for translational movement with said thumb wheel; said wheel having a first relative position in which said wheel is in disengaged condition with respect to said second motion input gear, and in which position said pawl means is in engaged condition; and a second relative position in which said wheel is in engaged condition with respect to said motion input gear, and in which position said pawl means is in disengaged position; said potentiometer including limit switch means, said pawl means including relay means connected to said switch means; whereby actuation of said limit switch means may move said pawl means to disengaged condition irrespective of the relative position of said thumb wheel.

References Cited in the file of this patent
UNITED STATES PATENTS

| | | |
|---|---|---|
| 1,455,799 | Meitner | May 22, 1923 |
| 1,836,655 | Dunford | Dec. 15, 1931 |
| 2,286,180 | Pickels | June 9, 1942 |
| 2,311,005 | Thurlow | Feb. 16, 1943 |